US007068658B2

(12) United States Patent
Rezaiifar et al.

(10) Patent No.: US 7,068,658 B2
(45) Date of Patent: *Jun. 27, 2006

(54) METHOD AND APPARATUS FOR RESOLVING AMBIGUITY IN RECEPTION OF MULTIPLE RETRANSMITTED FRAMES

(75) Inventors: Ramin Rezaiifar, San Diego, CA (US); Nikolai K. N. Leung, Arlington, VA (US)

(73) Assignee: Qualcomm Incorporated, San Diego, CA (US)

( * ) Notice: Subject to any disclaimer, the term of this patent is extended or adjusted under 35 U.S.C. 154(b) by 565 days.

This patent is subject to a terminal disclaimer.

(21) Appl. No.: 10/128,212

(22) Filed: Apr. 22, 2002

(65) Prior Publication Data

US 2002/0141414 A1  Oct. 3, 2002

Related U.S. Application Data

(63) Continuation of application No. 09/113,996, filed on Jul. 10, 1998, now Pat. No. 6,408,003, which is a continuation-in-part of application No. 09/082,085, filed on May 20, 1998, now Pat. No. 6,314,101, which is a continuation-in-part of application No. 08/877,294, filed on Jun. 17, 1997, now Pat. No. 6,011,796.

(51) Int. Cl.
*H04Q 7/20* (2006.01)
(52) U.S. Cl. ................................... 370/394
(58) Field of Classification Search ............... 370/394, 370/350, 389, 328
See application file for complete search history.

(56) References Cited

U.S. PATENT DOCUMENTS 4,439,859 A    3/1984   Donnan ...................... 371/32

(Continued)

FOREIGN PATENT DOCUMENTS

WO           9636154        11/1996

OTHER PUBLICATIONS

Easton, Malcolm C. "Design Choices for Selective-Repeat Retransmission Protocols" IEEE Transactions on Communications, vol. Com 29 (7): 944-953 (Jul. 1981).

(Continued)

*Primary Examiner*—Min Jung
(74) *Attorney, Agent, or Firm*—Philip R. Wadsworth; Thien T. Nguyen; W. Chris Kim

(57) ABSTRACT

A method and apparatus for resolving ambiguity in reception of multiple retransmitted frames includes ascertaining for each data frame received from a transmitter whether the frame is a retransmitted frame. If the frame is a retransmitted frame, the frame may be stored in a resequencing buffer. If an abort timer associated with the second round of retransmission has been set for the retransmitted frame, an associated negative-acknowledgment-list (NAK-list) entry is not removed from a NAK list until the abort timer has expired. If the abort timer has not been set for the retransmitted frame, the associated NAK-list entry is removed from the NAK list. The method and apparatus may reside in a transport function in which a transmitter sends data frames to a receiver in accordance with the Radio Link Protocol interface. The transport function may reside in, e.g., a data-capable cellular or satellite-based base station and subscriber unit.

8 Claims, 12 Drawing Sheets

U.S. PATENT DOCUMENTS

| | | | |
|---|---|---|---|
| 4,617,657 A | 10/1986 | Drynan et al. | 370/60 |
| 5,056,109 A | 10/1991 | Gilhousen et al. | |
| 5,103,459 A | 4/1992 | Gilhousen et al. | |
| 5,151,899 A | 9/1992 | Thomas et al. | 470/394 |
| 5,210,752 A * | 5/1993 | Ito et al. | 370/337 |
| 5,267,261 A | 11/1993 | Blakeney, II et al. | |
| 5,291,483 A | 3/1994 | Nagai et al. | 370/394 |
| 5,337,313 A * | 8/1994 | Buchholz et al. | 370/394 |
| 5,588,000 A * | 12/1996 | Rickard | 370/428 |
| 5,594,490 A * | 1/1997 | Dawson et al. | 725/67 |
| 5,596,318 A * | 1/1997 | Mitchell | 340/7.22 |
| 5,610,595 A * | 3/1997 | Garrabrant et al. | 340/825.52 |
| 5,757,783 A * | 5/1998 | Eng et al. | 370/315 |
| 5,774,479 A | 6/1998 | Lee et al. | |
| 5,777,990 A | 7/1998 | Zehavi et al. | |
| 5,784,362 A | 7/1998 | Turina | 370/321 |
| 6,005,855 A | 12/1999 | Zehavi et al. | |
| 6,076,181 A | 6/2000 | Cheng | |
| 6,173,007 B1 | 1/2001 | Odenwalder et al. | |
| 6,189,122 B1 | 2/2001 | Cheng | |
| 6,639,906 B1 | 10/2003 | Levin | |

OTHER PUBLICATIONS

Simmons, Jane M. "Proof of Correctness of ATM Retransmission Scheme" Computer Networks and ISDN Systems 29:181-194 (1997).

Tomlinson, et al. "Selecting Sequence Numbers" Computer Communication Review 25:45-53 (1995).

* cited by examiner

METHOD AND APPARATUS FOR RESOLVING AMBIGUITY IN RECEPTION OF MULTIPLE RETRANSMITTED FRAMES

CROSS-REFERENCE TO RELATED APPLICATION

This application is a continuation application of U.S. application Ser. No. 09/113,996, filed Jul. 10, 1998, now U.S. Pat. No. 6,408,003, which is a continuation-in-part of U.S. application Ser. No. 09/082,085, now U.S. Pat. No. 6,314,101, filed May 20, 1998, which is a continuation-in-part of U.S. application Ser. No. 08/877,294, now U.S. Pat. No. 6,011,796, filed Jun. 17, 1997.

BACKGROUND OF THE INVENTION

I. Field of the Invention

The present invention pertains generally to the field of wireless communications, and more specifically to resolving ambiguity in the reception of multiple retransmitted frames.

II. Background

The field of wireless communications has many applications including, e.g., cordless telephones, paging, wireless local loops, and satellite communication systems. A particularly important application is cellular telephone systems for mobile subscribers. (As used herein, the term "cellular" systems encompasses both cellular and PCS frequencies.) Various over-the-air interfaces have been developed for such cellular telephone systems including, e.g., frequency division multiple access (FDMA), time division multiple access (TDMA), and code division multiple access (CDMA). In connection therewith, various domestic and international standards have been established including, e.g., Advanced Mobile Phone Service (AMPS), Global System for Mobile (GSM), and Interim Standard 95 (IS-95). In particular, IS-95 and its derivatives, IS-95A, IS-95B, ANSI J-STD-008, IS-99, IS-657, IS-707A, etc. (often referred to collectively herein as IS-95), are promulgated by the Telecommunication Industry Association (TIA) and other well known standards bodies.

Cellular telephone systems configured in accordance with the use of the IS-95 standard employ CDMA signal processing techniques to provide highly efficient and robust cellular telephone service. An exemplary cellular telephone system configured substantially in accordance with the use of the IS-95 standard is described in U.S. Pat. No. 5,103,459, which is assigned to the assignee of the present invention and fully incorporated herein by reference. The aforesaid patent illustrates transmit, or forward-link, signal processing in a CDMA base station. Exemplary receive, or reverse-link, signal processing in a CDMA base station is described in U.S. Pat. No. 6,639,906, which is assigned to the assignee of the present invention and fully incorporated herein by reference.

In CDMA systems, over-the-air power control is a vital issue. An exemplary method of power control in a CDMA system is described in U.S. Pat. No. 5,056,109, which is assigned to the assignee of the present invention and fully incorporated herein by reference.

A primary benefit of using a CDMA over-the-air interface is that communications are conducted over the same RF band. For example, each mobile subscriber unit (typically a cellular telephone) in a given cellular telephone system can communicate with the same base station by transmitting a reverse-link signal over the same 1.25 MHz of RF spectrum. Similarly, each base station in such a system can communicate with mobile units by transmitting a forward-link signal over another 1.25 MHz of RF spectrum. It is to be understood that while 1.25 MHz is a preferred CDMA channel bandwidth, the CDMA channel bandwidth need not be restricted to 1.25 MHz, and could be any number, such as, e.g., 5 MHz.

Transmitting signals over the same RF spectrum provides various benefits including, e.g., an increase in the frequency reuse of a cellular telephone system and the ability to conduct soft handoff between two or more base stations. Increased frequency reuse allows a greater number of calls to be conducted over a given amount of spectrum. Soft handoff is a robust method of transitioning a mobile unit from the coverage area of two or more base stations that involves simultaneously interfacing with two base stations. (In contrast, hard handoff involves terminating the interface with a first base station before establishing the interface with a second base station.) An exemplary method of performing soft handoff is described in U.S. Pat. No. 5,267,261, which is assigned to the assignee of the present invention and fully incorporated herein by reference.

Under the IS-99 and IS-707A standards (referred to hereinafter collectively as IS-707A), an IS-95-compliant communications system can provide both voice and data communications services. Data communication services allow digital data to be exchanged using a receiver and an RF interface to one or more transmitters. Examples of the type of digital data typically transmitted using the IS-707A standard include computer files and electronic mail.

In accordance with both the IS-95 and IS-707A standards, the data exchanged between a wireless terminal and a base station is processed in frames. To increase the likelihood that a frame will be successfully transmitted during a data transmission, IS-707A employs a radio link protocol (RLP) to track the frames transmitted successfully, and to perform frame retransmission when a frame is not transmitted successfully. Retransmission is performed up to three times in IS-707A, and it is the responsibility of the higher layer protocols to take additional steps to ensure that the frame transmitted is successful.

In order to track which frames have been transmitted successfully, IS-707A calls for an eight-bit sequence number to be included as a frame header in each frame transmitted. The sequence number is incremented for each frame from 0 to 256 and then reset back to zero. An unsuccessfully transmitted frame is detected when a frame with an out-of-order sequence number is received, or an error is detected using CRC checksum information or other error detection methods. Once an unsuccessfully transmitted frame is detected, the receiver transmits a negative-acknowledgment message (NAK) to the transmit system that includes the sequence number of the frame that was not received. The transmit system then retransmits the frame including the sequence number as originally transmitted. If the retransmitted frame is not received successfully, a second negative-acknowledgment message is sent to the transmit system. The transmit system typically responds by notifying the controlling application or network layer of the failed transmission.

Under IS-95A and IS-707A, frames are transmitted once every twenty milliseconds (ms). Thus, an eight-bit sequence number can track 256 frames transmitted over a five-second interval. Five seconds is typically sufficient to allow a failed frame transmission to be detected, and a retransmission to be performed, and therefore an eight-bit sequence number provides sufficient time for frame retransmission. Thus, retransmitted frames can be uniquely identified without ambiguity caused by a sequence "wrap-around" whereby the eight-bit sequence number repeats.

Since the original development of IS-95A and IS-707A, however, additional protocols and standards have been proposed and developed that allow data to be transmitted at greater rates. Typically, these new protocols and standards use the same frame structure as IS-95A and IS-707A in order to maintain as much compatibility as possible with pre-existing systems and standards. Nevertheless, while maintaining compatibility with pre-existing standards and systems is desirable, the use of the same type of frame within these higher rate protocols and standards substantially increases the number of frames that are transmitted during a given period of time. For example, if the transmission rate is increased by a factor of four, the time required to transmit 256 frames is reduced to 1.25 seconds, rather than the five seconds required previously. A time period of 1.25 seconds is typically insufficient to allow a failed frame transmission to be detected, and a retransmission attempted, before the eight-bit sequence number repeats. Thus, the use of an eight-bit sequence number is insufficient to allow unique identification of frames for the time period necessary to perform the desired retransmission sequence.

A well-known protocol, the Radio Link Protocol (RLP), uses an eight-bit sequence counter included in frames sent over the air. The eight bits represent the least significant bits of a twelve-bit counter kept internally at both the receiver and the transmitter. The twelve-bit counter is updated based on the eight-bit numbers sent over the air. It stands to reason that delayed frames present a problem. If multiple frames are simultaneously sent from the transmitter but are delayed with respect to each other at the receiver, the twelve-bit counters will be incorrectly updated and the RLP will abort.

While the number of bits in the sequence number could be increased, such an increase would substantially alter the frame format and therefore violate the goal of maintaining substantial compatibility with previously existing systems and standards. Additionally, increasing the number of bits in the sequence number would waste available bandwidth. A conventional solution such as increasing the number of bits used to represent the sequence counter is therefore inadequate because it would introduce additional overhead per transmission and decrease of the net throughput of the transport service. Hence, it would be desirable to provide a method for extending the sequence number range without modifying the number of bits used for the sequence number. Such a method would advantageously be capable of interpreting an impossibly large number of missing data frames derived from the sequence number as a delayed frame, thereby increasing the throughput of the transport function. It would be advantageous, then, to provide an efficient method of detecting delayed frames in a transport function using a minimum number of bits.

In the RLP transport function, which maps an eight-bit over-the-air frame sequence number to a twelve-bit sequence number, the transmitter (which may reside in a data-capable cellular- or satellite-based base station, or a subscriber unit) may send multiple copies of the same retransmitted frame to increase the probability of reception. For example, in RLP Type II (as defined in IS-95 and IS-707A), two NAK messages are sent when a frame transmission is unsuccessful. The frame is then retransmitted twice. If the second round of transmission is unsuccessful, three more NAK messages are generated, and three copies of the retransmitted frame are sent. In this second round of NAK, there exists the potential for overlap with other unsuccessfully transmitted frames. When the first of the three retransmitted copies arrives, the associated NAK-list entry is removed from the NAK list. The second copy may be interpreted as the arrival of a retransmitted frame having the same least-significant eight bits. Hence, there is an inherent ambiguity generated in mapping the eight-bit sequence number to the twelve-bit number because retransmitted RLP frames that have the same least-significant-bit values but different most-significant-bit values must be differentiated based solely on observation of the least-significant bits. Thus, there is a need for a method of resolving ambiguity in the reception of multiple retransmitted frames.

SUMMARY OF THE INVENTION

The present invention is directed to a method of resolving ambiguity in the reception of multiple retransmitted frames. Accordingly, in one aspect of the invention, a method of resolving ambiguity in a transport function in which frames are sent from a transmitter to a receiver advantageously includes the steps of ascertaining whether each frame is a retransmitted frame; storing each retransmitted frame; determining for each retransmitted frame whether a timer has been set; removing for each retransmitted frame an associated list entry from a predefined list if the timer has not been set; and retaining for each retransmitted frame the list entry in the list, if the timer has been set, until the timer expires. In another aspect of the invention, a data transmission system advantageously includes a transmitter; a receiver coupled to the transmitter via an interface for receiving data frames from the transmitter; and a protocol processing component housed in the receiver for ascertaining whether the received data frames are retransmitted data frames, storing the retransmitted data frames, determining for each retransmitted data frame whether a timer has been set, removing for each retransmitted data frame an associated list entry from a predefined list if the timer has not been set, and retaining for each retransmitted data frame the list entry in the list, if the timer has been set, until the timer expires.

DETAILED DESCRIPTION OF THE PREFERRED EMBODIMENTS

The embodiments described hereinbelow reside in a personal communication system operating in accordance with the use of CDMA signal processing techniques of the IS-707A and IS-95 standards. While the present invention is especially suited for use within such a communications system, it should be understood that the present invention may be employed in various other types of communications systems that transmit data via frames or packets, including both wireless and wireline communication systems, and satellite-based communication systems. Additionally, throughout the description, various well-known systems are set forth in block form. This is done in order to avoid unnecessarily obscuring the disclosure.

Various cellular systems for wireless telephone communication employ fixed base stations that communicate with mobile units via an over-the-air interface. Such cellular systems include, e.g., AMPS (analog), IS-54 (North American TDMA), GSM (Global System for Mobile communications TDMA), and IS-95 (CDMA). In a preferred embodiment, the cellular system is a CDMA system.

Figure 1:
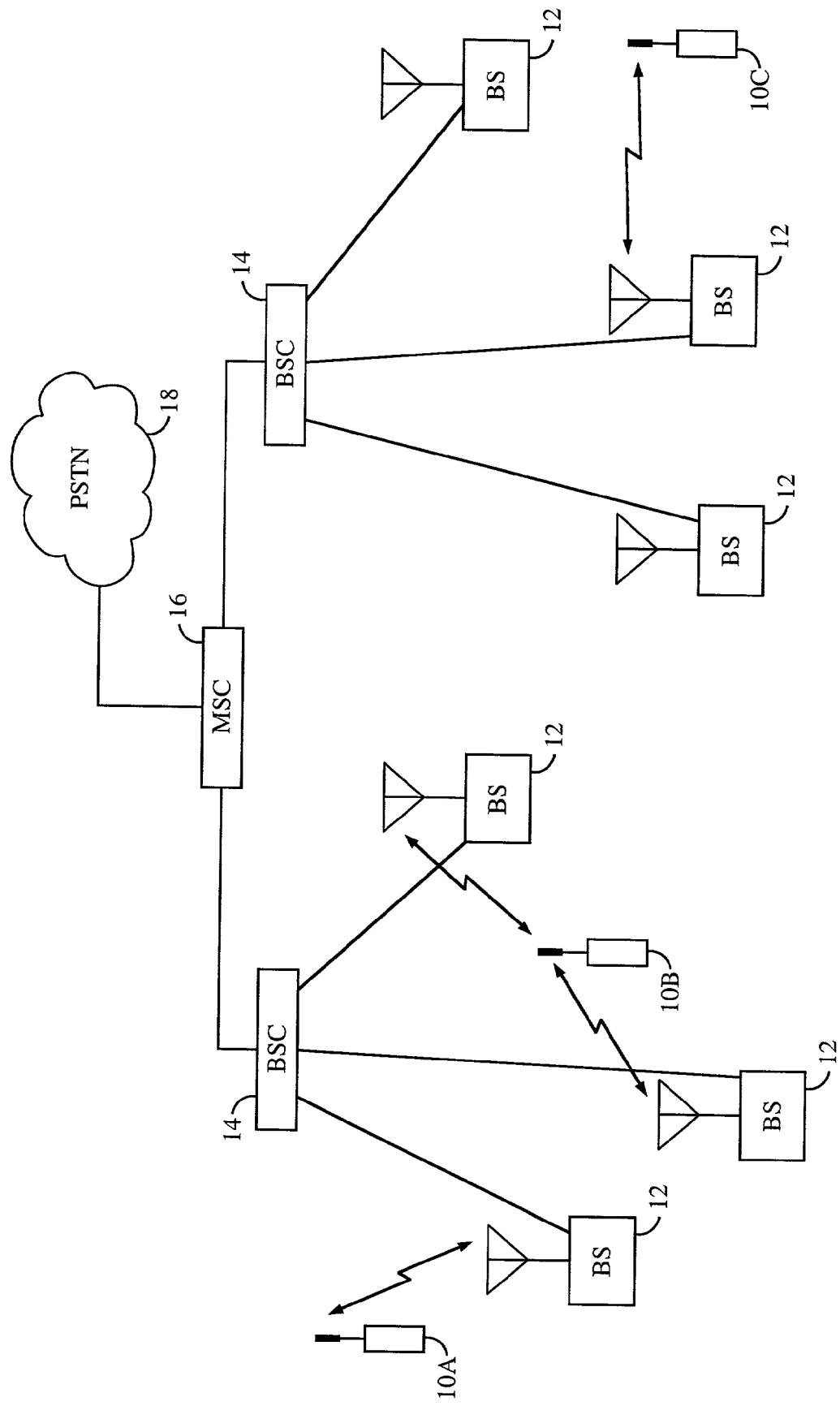
FIG. 1 is a block diagram of a cellular telephone system.

As illustrated in FIG. 1, a CDMA wireless telephone system generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured in accordance with any of several known interfaces including, e.g., E1/T1, ATM, IP, PPP, Frame Relay, HDSL, ADSL, or xDSL. It is to be understood that there can be more than two BSCs 14 in the system. Each base station 12 advantageously includes at least one sector (not shown), each sector comprising an omnidirectional antenna or antenna pointed in a particular direction radially away from the base station 12. Alternatively, each sector may comprise two antennas for diversity reception. Each base station 12 may advantageously be designed to support a plurality of frequency assignments, with each frequency assignment advantageously comprising 1.25 MHz of spectrum. Alternatively, each frequency assignment may comprise an amount of spectrum other than 1.25 MHz, such as, e.g., 5 MHz. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. (Alternatively, individual sectors of a given BTS 12 may be referred to as cell sites.) The mobile subscriber units 10 are typically cellular telephones 10, and the cellular telephone system is advantageously a CDMA system configured for use in accordance with the IS-95 standard.

During typical operation of the cellular telephone system, the base stations 12 receive sets of reverse-link signals from sets of mobile units 10. The mobile units 10 are conducting telephone calls or other communications. Each reverse-link signal received by a given base station 12 is processed within that base station 12. The resulting data is forwarded to the BSCs 14. The BSCs 14 provide call resource allocation and mobility management functionality including the orchestration of soft handoffs between base stations 12. The BSCs 14 also route the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward-link signals to sets of mobile units 10.

In the embodiments described below, an algorithm serves to map an eight-bit sequencing number for counting frames sent over the air into a twelve-bit sequencing number in accordance with the Radio Link Protocol (RLP), a protocol that is known in the art. The algorithm is advantageously carried out with RLP software instructions and a microprocessor. In one embodiment, an RLP component may reside in a base station 12. Alternatively, the RLP component may reside in a BSC 14. Those of skill in the art would appreciate that the RLP algorithm may be used not only in a BSC 14 or a base station 12, but could be used in any transport layer in which multiple data frames are received in a particular processing period.

Figure 2:
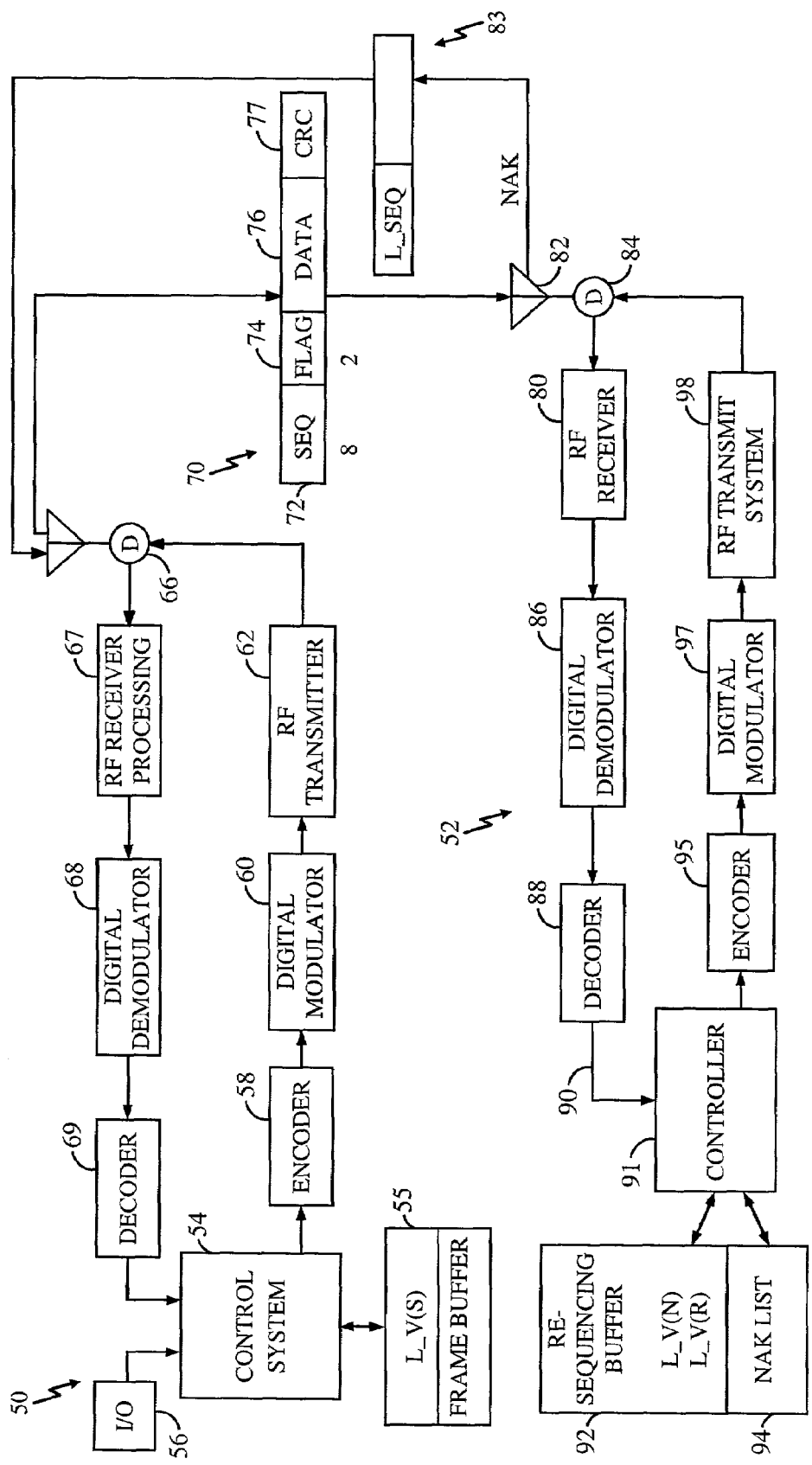
FIG. 2 is a schematic diagram of a transmitter and receiver.

In FIG. 2, two communication systems configured in accordance with an exemplary embodiment are illustrated in block form. The higher rate communication is being conducted from transmitter 50 to receiver 52. In an exemplary configuration, transmitter 50 is located in a base station 12 and receiver 52 is in a wireless terminal 10; however, the locations may be reversed. Within transmitter 50, control system 54 receives data frames from input/output (I/O) 56 and provides that data to encoder 58. Encoder 58 performs convolutional encoding, generating code symbols that are received by digital modulator 60. Digital modulator 60 performs direct sequence modulation on the code symbols with one or more binary channel codes and one or more binary spreading codes, yielding chipped symbols that are received by radio frequency (RF) transmitter 62. The chipped symbols are upconverted to the carrier frequency band by RF transmitter 62 and transmitted from antenna system 64 via diplexer 66.

Various methods and apparatus for performing the digital modulation and RF upconversion can be employed. A set of particularly useful methods and apparatus are described in U.S. Pat. No. 6,005,855, entitled METHOD AND APPARATUS FOR PROVIDING VARIABLE RATE DATA IN A COMMUNICATIONS SYSTEM USING STATISTICAL MULTIPLEXING, filed Apr. 28, 1995; U.S. Pat. No. 5,777,990, entitled METHOD AND APPARATUS FOR PROVIDING VARIABLE RATE DATA IN A COMMUNICATIONS SYSTEMS USING NON-ORTHOGONAL OVERFLOW CHANNELS, filed Feb. 28, 1995; and U.S. Pat. No. 6,173,007, entitled HIGH DATA RATE SUPPLEMENTAL CHANNEL FOR CDMA TELECOMMUNICATIONS SYSTEM, filed Jan. 15, 1997; each of which is assigned to the assignee of the present invention and fully incorporated herein by reference. It should be understood that some of the above-referenced patent applications are directed to the forward link, and are therefore more suited for use with the transmitter 50, while others are directed to the reverse link, and are therefore more suited for use with the receiver 52.

In an exemplary embodiment, the data transmitted from antenna system 64 is formatted in accordance with frames 70 that include an eight-bit sequence field (SEQ number) 72, a retransmit flag 74, and a data field 76. A frame 70 may include other fields that are not shown because they are not particularly relevant to the present invention. In a preferred embodiment, the frames are formatted substantially in accordance with the frame structures defined in the IS-707A standard, with the addition of retransmit flag 74.

To provide data frames to encoder 58 in an orderly manner, control system 54 stores the frames within frame buffer 55 and updates an index value L_V(S). Frame buffer 55 and index value L_V(S) are preferably stored within a memory system. In a preferred embodiment, index value L_V(S) is a twelve-bit sequence number that is incremented after the transmission of each frame as described in greater detail below. The least significant eight bits of index value L_V(S) are placed in the sequence field of a frame 72.

Within receiver 52, RF receiver 80 downconverts and digitizes the RF signals on which frame 70 is transmitted using antenna system 82 and diplexer 84. Digital demodulator 86 demodulates the downconverted, or "baseband," signals using the necessary binary codes, generating soft decision data that is received by decoder 88. Decoder 88 performs maximum likelihood trellis, or Viterbi, decoding, yielding hard decision data 90 that is provided to controller 91.

Controller 91 reforms frame 70 using hard decision data 90 and determines whether the frame has been received in sequence relative to the frames that have already been received using the SEQ number, index variable L_V(N), and L_V(R), as well as resequencing buffer 92 and NAK list 94 as described in further detail below.

If controller 91 determines that the frame has been received out of sequence relative to the frames that have already been received, or if the frame is received in error, it generates a negative-acknowledgment (NAK) message that is received by encoder 95. Encoder 95 performs convolutional encoding to generate code symbols that are direct sequence spread spectrum modulated by digital modulator 97, preferably in accordance with the IS-95 reverse link, and the chipped symbols are upconverted by RF transmit system 98 and transmitted as NAK 83 from antenna system 82 via diplexer 84. The L_SEQ for the NAKed frame is stored within NAK list 94.

Referring again to transmitter 50, RF receiver 67 receives the RF signal via antenna system 64 and diplexer 66. RF receiver 67 downconverts and digitizes the RF signal, yielding samples that are demodulated using digital demodulator 68. Decoder 69 decodes the soft decision data from digital demodulator 68, and control system 54 receives the hard decision data from decoder 69, thereby detecting the NAK 83 from receiver 52 contained in the hard decision data.

Control system 54 receives NAK 83 and retrieves the NAKed frame from transmit buffer 55. The retrieved frames are retransmitted in accordance with the original transmission as described above (including the original sequence number).

Figure 3:
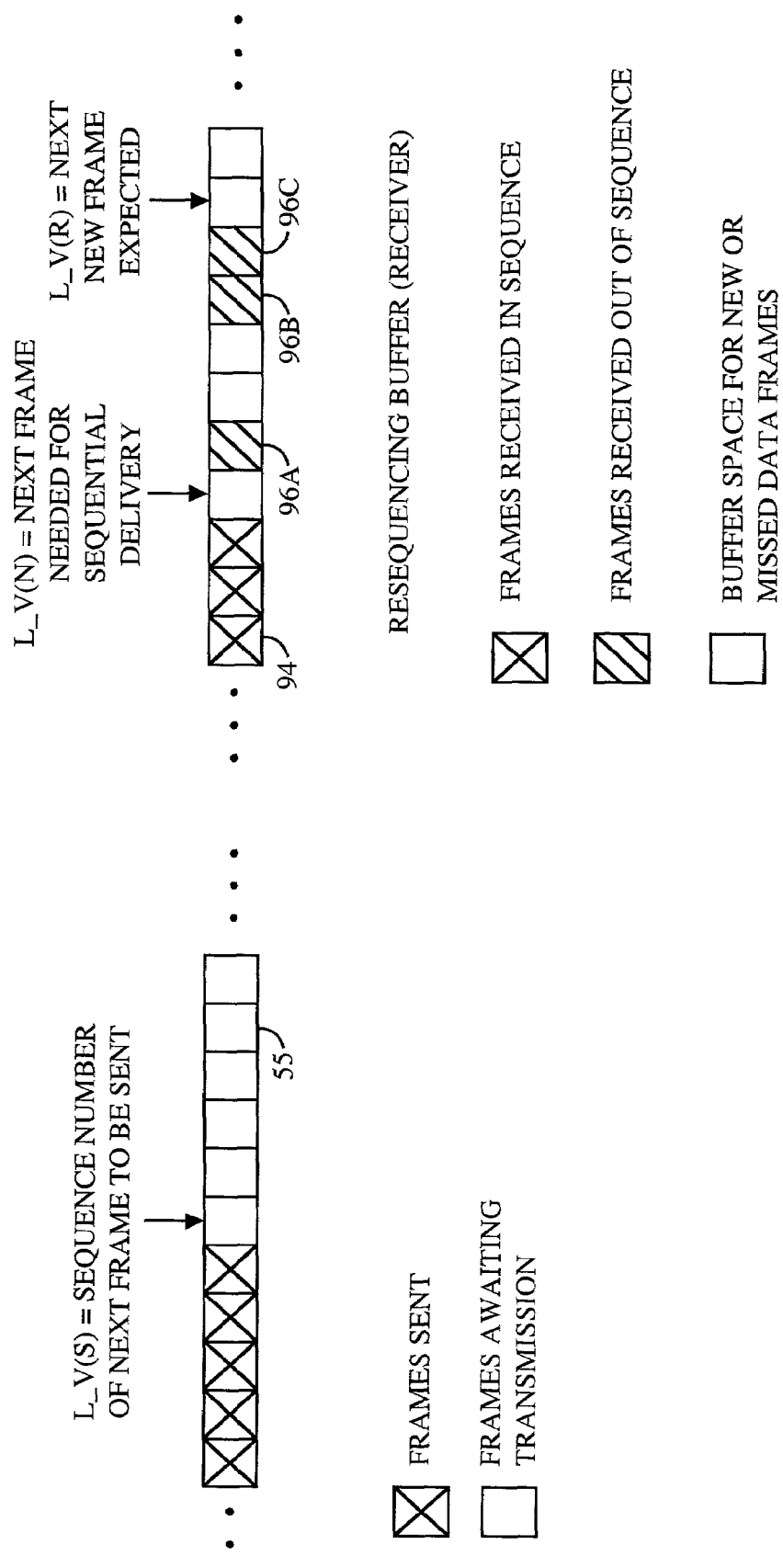
FIG. 3 is a diagram of a frame buffer and resequencing buffer.

The configuration of frame buffer 55, resequencing buffer 92, and indexes L_V(S), L_V(N), and L_V(R), when used in accordance with one embodiment, are illustrated in FIG. 3. Within the transmit frame buffer 55, frames already transmitted once are shaded, and frames to be transmitted are clear. In a preferred embodiment, indexes L_V(S), L_V(N), and L_V(R) are twelve-bit numbers. Index L_V(S) is set to the sequence number of the next frame to be transmitted. When the frame is actually transmitted, the eight-bit SEQ number of the frame is set to the eight least significant bits of index L_V(S).

Within resequencing buffer 92, index L_V(R) is set to the twelve-bit sequence of the next frame expected. Index L_V(N) is set to the twelve-bit sequence of the next frame needed for sequential delivery, or for which processing is still pending. When a predetermined number of NAKs 83 have been sent without receipt of the corresponding frame, attempted processing of the frame is terminated and the data with the missing frame is passed to the higher layer protocols such as, e.g., the transport layer. As shown, NAKed frames 96*a–c* can be received with sequence numbers between L_V(N) and (L_V(R)–1) MOD 4096, inclusively.

Figure 4:
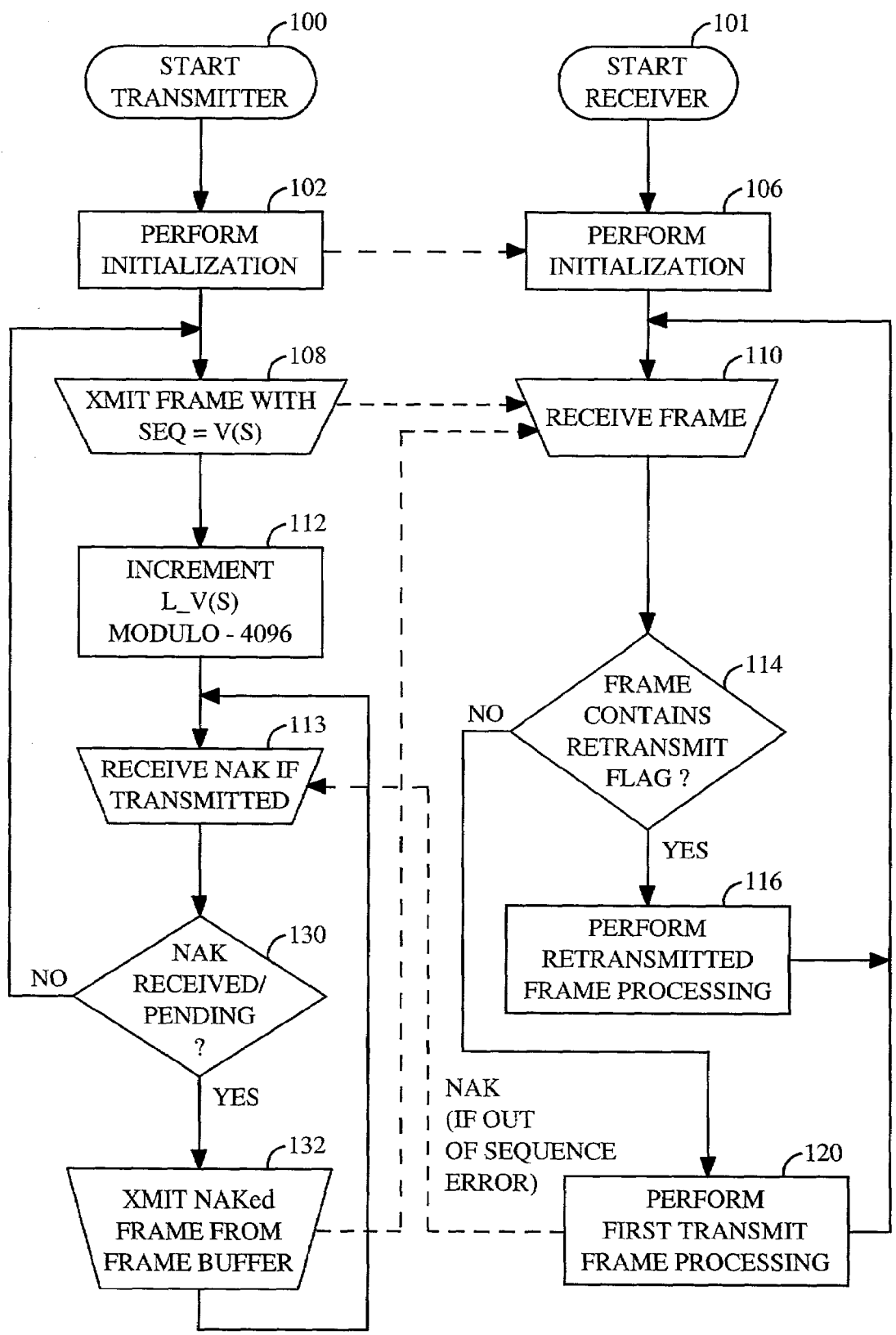
FIG. 4 is a flow chart illustrating the operation of a transmitter and a receiver during a communication.

In FIG. 4, a flow diagram illustrates the operation of the transmitter 50 and receiver 52 during a communication performed in accordance with one embodiment. The transmission begins at the transmitter at step 100, with reception at the receiver occurring at step 101. At step 102, initialization is performed, during which index L_V(S) is set to zero within transmitter 50 and L_V(R) is set to zero within receiver 52.

At step 108, the transmitter 50 transmits a frame (indicated by the dashed line) when data is available for transmission, with the SEQ number of the frame being set to the eight least significant bits of index L_V(S), and being referred to as V(S). Additionally, the retransmit flag is set to zero to indicate that the frame is a newly transmitted frame. At step 112, index L_V(S) is incremented MOD 4096, and at step 113 the transmitter performs receive processing for any NAK message transmitted from receiver 52. In one embodiment, when no data is available, "idle" frames having the current SEQ number may be sent repeatedly until data becomes available (idle transmissions not shown).

At step 130 the transmitter 50 determines if a NAK 83 has been received or is pending, and if so the NAKed frames are retrieved from the transmit buffer using the long sequence number contained in the NAK message and retransmitted at step 132 with the original SEQ number and the retransmit field set to one. Once the frame is retransmitted the pending or received NAK 83 is cleared and processing then continues at step 113.

If a NAK message has not been received or is not pending, the transmitter returns to step 108 and the processing continues.

Within receiver 52, the processing begins at step 101, and at step 106 L_V(S) is received from transmitter 50. At step 110, receiver 52 receives any frames transmitted from transmitter 50 at either step 108 (new transmission), or at step 132 (retransmission), and at step 114 receiver 52 examines the status of the retransmit flag of the frame to determine if the received frame is a retransmitted frame or a new frame. If the frame is a retransmitted frame, retransmit processing is performed at step 116, and then the receiver returns to step 110. If the frame is not a retransmitted frame, first transmit processing of the frame is performed at step 120, and then step 110 is performed again.

Figure 5:
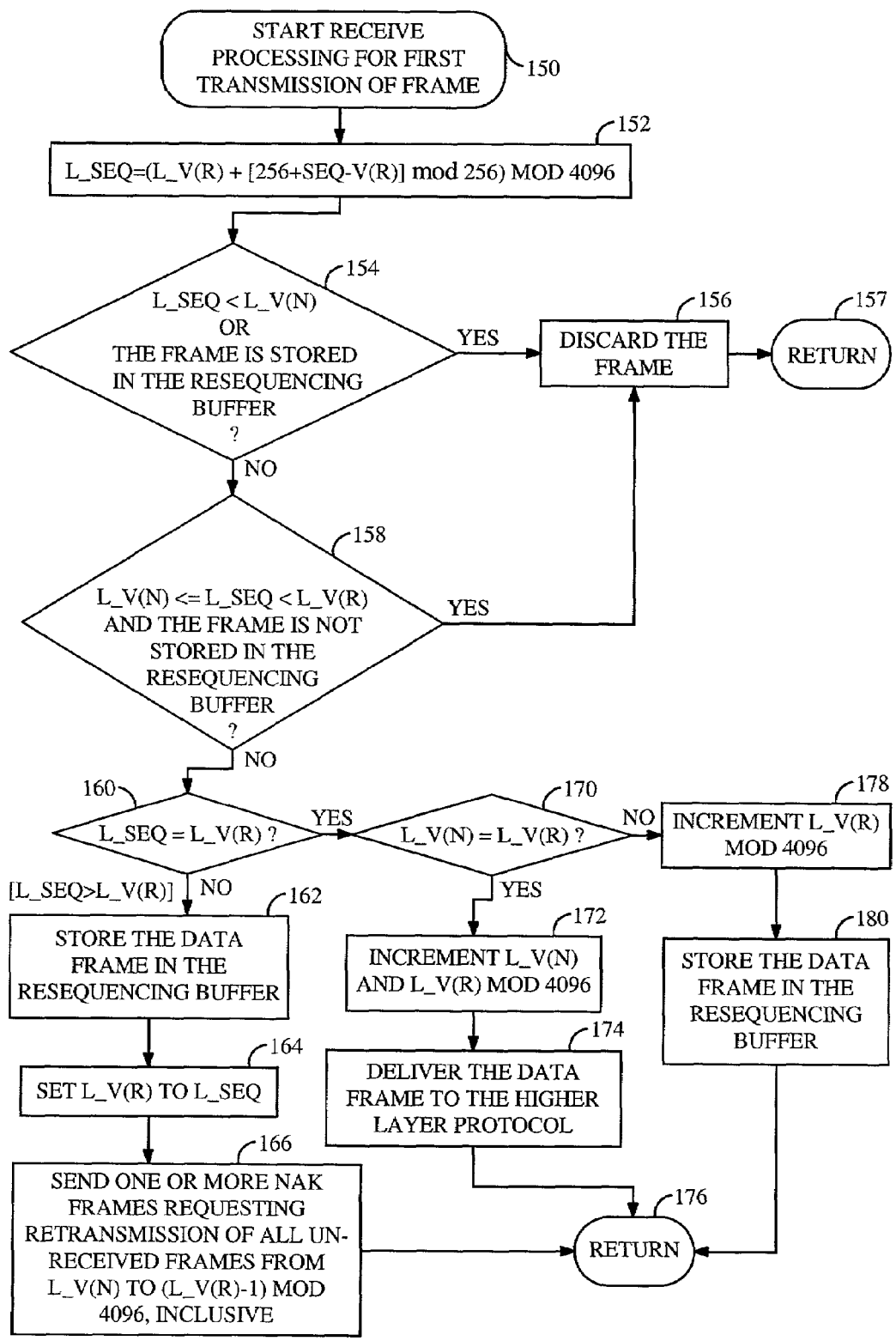
FIG. 5 is a flow chart illustrating the operation of the receiver during the reception of a newly transmitted frame.

In FIG. 5, a flow chart illustrates the operation of receiver 52 when processing the first transmission of a frame during step 120 of FIG. 4 in accordance with one embodiment. The first transmission processing begins at step 150, and at step 152 L_SEQ is set according to the following equation:

$$L\_SEQ = \{L\_V(R) + [256 + SEQ - V(R)] \, MOD \, 256\} \, MOD \, 4096, \qquad (1)$$

where V(R) is the eight least significant bits of L_V(R) and SEQ is the sequence number contained in the SEQ field of the frame being processed. At step 154 it is determined whether L_SEQ is less than L_V(N), or that the frame has been stored in the resequencing buffer 92. If so, the frame is discarded at step 156 and the receive system returns from first transmission processing at step 157. As noted above, L_V(N) is set to the next frame needed for sequential delivery of the data.

If L_SEQ is not less than L_V(N) and the frame has not been stored in the resequencing buffer 92, it is further determined at step 158 whether L_SEQ is greater than or equal to L_V(N) and less than L_V(R), and whether the frame has been not stored in the resequencing buffer 92. If so, the frame is discarded at step 156 and the receive system returns from first transmission processing at step 157. Otherwise, it is further determined at step 160 whether L_SEQ equals L_V(R) and therefore is the next frame needed for sequential delivery L_V(R).

If L_SEQ does not equal L_V(R), an out-of-order frame has been received, and the frame is stored in the resequencing buffer 92 at step 162, and L_V(R) is set to L_SEQ at step 164. At step 166, the receive system transmits one or more NAK messages requesting retransmission of all unreceived frames from L_V(N) to (L_V(R)−1) MOD 4096, inclusive. The receive system then returns from the first transmission processing at step 176.

If, at step 160, it is determined that L_SEQ equals L_V(R), the frame has been received in order, causing it to further be determined at step 170 whether L_V(N) equals L_V(R), which indicates that no NAKed frames are outstanding.

If L_V(N) equals L_V(R), L_N(N) and L_V(R) are incremented MOD 4096 at step 172. The data frame is delivered to the higher layer protocol at step 174, and the receiver 52 returns from first transmit processing at step 176.

If it is determined at step 160 that L_V(N) does not equals L_V(R), and therefore that NAKed frames remain outstanding, L_V(R) is incremented MOD 4096 at step 178, and at step 180 the frame is stored in the resequencing buffer 92. The receiver 52 then returns from the first frame transmit processing at step 176.

Figure 6:
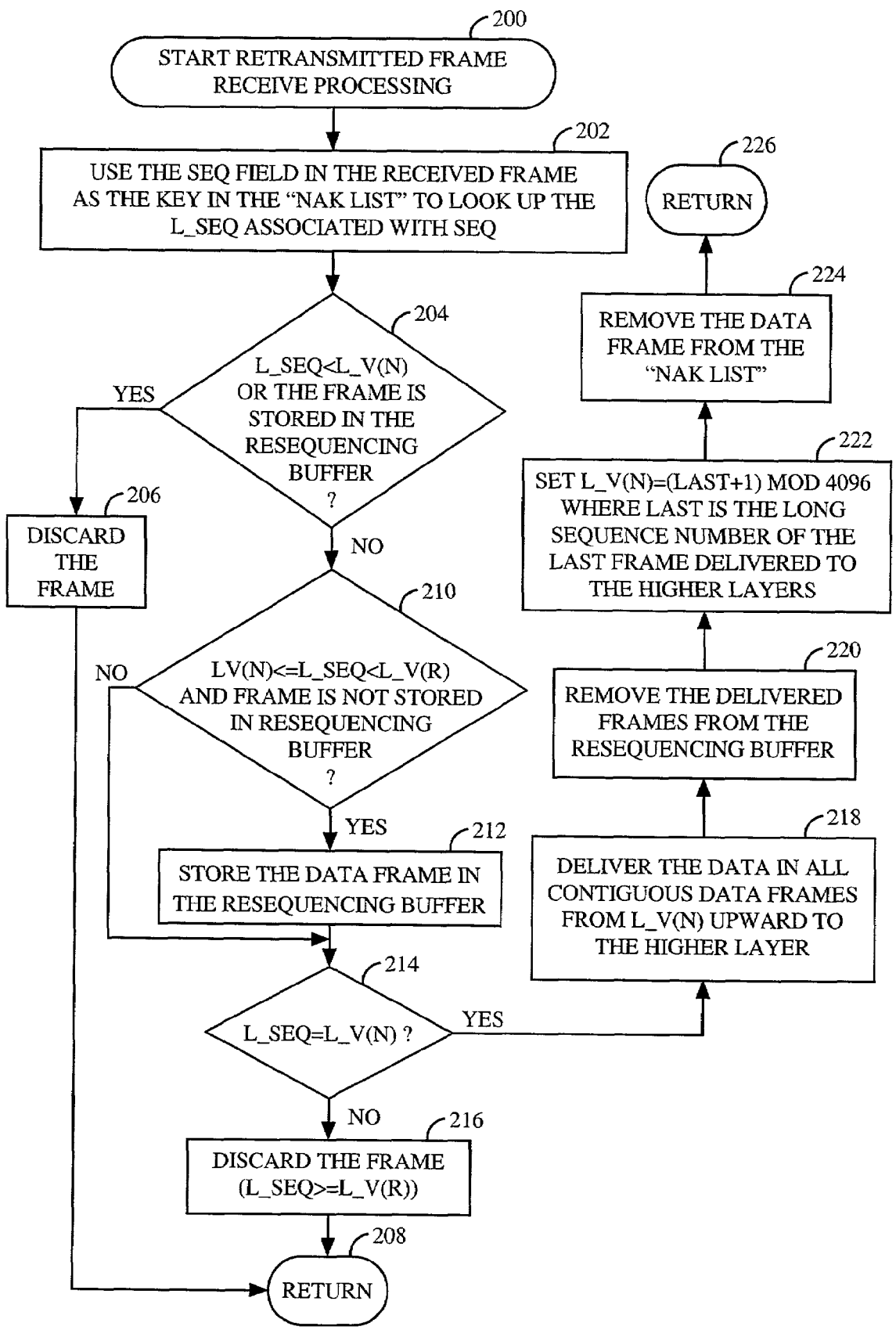
FIG. 6 is a flow chart illustrating the operation of the receiver during the reception of a retransmitted frame.

In FIG. 6, a flow diagram illustrates the operation of the receiver 52 during step 116 when a retransmitted frame is received in accordance with one embodiment. The processing of the retransmitted frame begins at step 200, and at step 202 the SEQ field in the received frame is used as the key to look up an L_SEQ associated with the SEQ in the NAK list 94 (see FIG. 2). At step 204 it is determined whether the L_SEQ is less than L_V(N), or whether the frame has already been stored in the resequencing buffer 92. If so, the frame is discarded at step 206, and the receiver 52 returns from retransmit processing at step 208.

If L_SEQ is not less than L_V(N), and the frame has not been stored in the resequencing buffer 92, it is further determined at step 210 whether L_SEQ is greater than or equal to L_V(N) and less than L_V(R), and if the frame has not been stored in the resequencing buffer 92. If so, the frame is stored in the resequencing buffer 92 at step 212 before step 214 is performed. Otherwise, step 214 is performed.

At step 214, it is determined whether L_SEQ is equal to L_V(N), and if not, the frame is discarded at step 216 because the retransmitted frame has a sequence number that is higher than the next new frame expected, and therefore an error has occurred. Once the frame has been discarded, receiver 52 returns from retransmitted frame processing at step 208.

If L_SEQ equals L_V(N), the data in all the contiguous frames formed by the addition of the retransmitted frame being processed from L_V(N) upward are delivered to the next higher processing layer at step 218, and the delivered frames are removed from the resequencing buffer 92 at step 220. At step 222 L_V(N) is set to LAST+1, where LAST is the long sequence number (L_SEQ) of the last frame delivered to the higher layer at step 218. At step 224 the frame is removed from the NAK list and the receiver 52 returns from processing the retransmitted frame at step 226.

Figure 7:
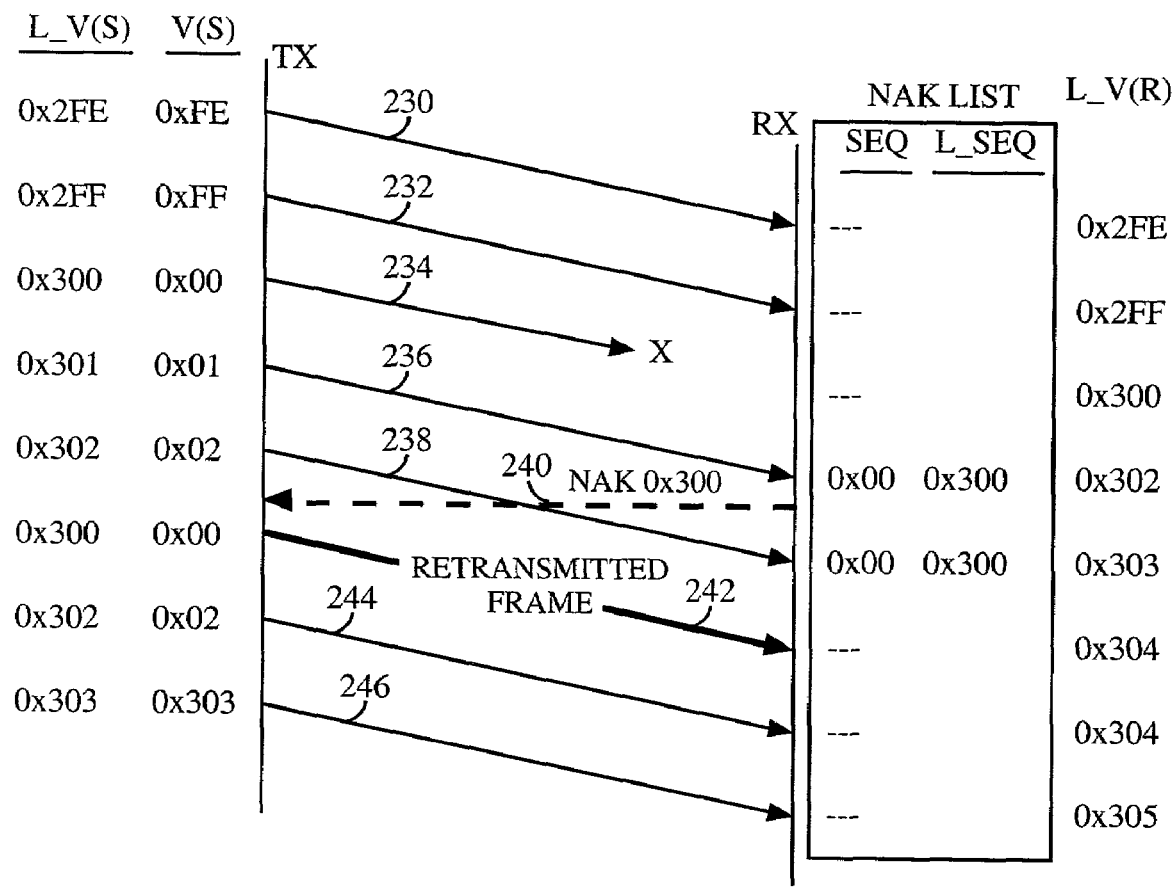
FIG. 7 is a message diagram illustrating the operation of the transmitter and the receiver during an exemplary communication.

In FIG. 7, a message diagram illustrates the messages transmitted during an exemplary communication performed in accordance with one embodiment. Transmitter 50 is shown on the left, and receiver 52 is shown on the right. Transmitter 50 maintains index L_V(S), and frames are transmitted with value V(S) in the sequence field, where V(S) is the eight least significant bits of L_V(S). At the receiver 52 the NAK list after each transmission is shown. All numbers are shown in hexadecimal.

The first frame 230 is transmitted when index L_V(S) is equal to 0x2FE, and therefore with a SEQ number of 0xFE. After the transmission of frame 230, index L_V(S) is incremented to 0x2FF and frame 232 is transmitted with a SEQ number of 0xFF. Both frames 230 and 232 are received successfully by receiver 52, causing index L_V(R) to increment twice from 0x2FE to 0x300.

Frame 234 is transmitted with a SEQ number of 0x00 and is not successfully received by receiver 52. L_V(S) is then incremented to 0x301, and frame 236 is transmitted with a SEQ number of 0x01 and is received successfully by receiver 52.

Upon receipt of frame 236, receiver 52 detects the out-of-order sequence number because frame 234 was not received. In response, receiver 52 generates NAK message 240 containing the full twelve-bit index L_V(R) for the unreceived frame 0x300. Additionally, receiver 52 updates the NAK list 94 to indicate that a NAK 83 has been transmitted for a frame with SEQ number 0x00 and L_SEQ number 0x300. Also, receiver 52 starts a NAK timer, which tracks the time that has expired since the transmission of NAK message 240.

During the transmission of NAK message 240, transmitter 50 transmits another frame 238 with a SEQ number of 0x02, which is received successfully by receiver 52. Upon receipt of NAK message 240, transmitter 50 generates retransmitted frame 242 having SEQ number 0x00 and the retransmit flag 74 (see FIG. 2) is set to one. Upon receipt of retransmitted frame 242, receiver 52 detects the retransmission bit and matches the SEQ number with the SEQ number in NAK list 94. Once the match is made, retransmitted frame 242 is placed within the resequencing buffer 92 (see FIG. 2) and the entry within NAK list 94 is removed. Frames 244 and 246 are then transmitted and received in normal fashion.

Figure 8:
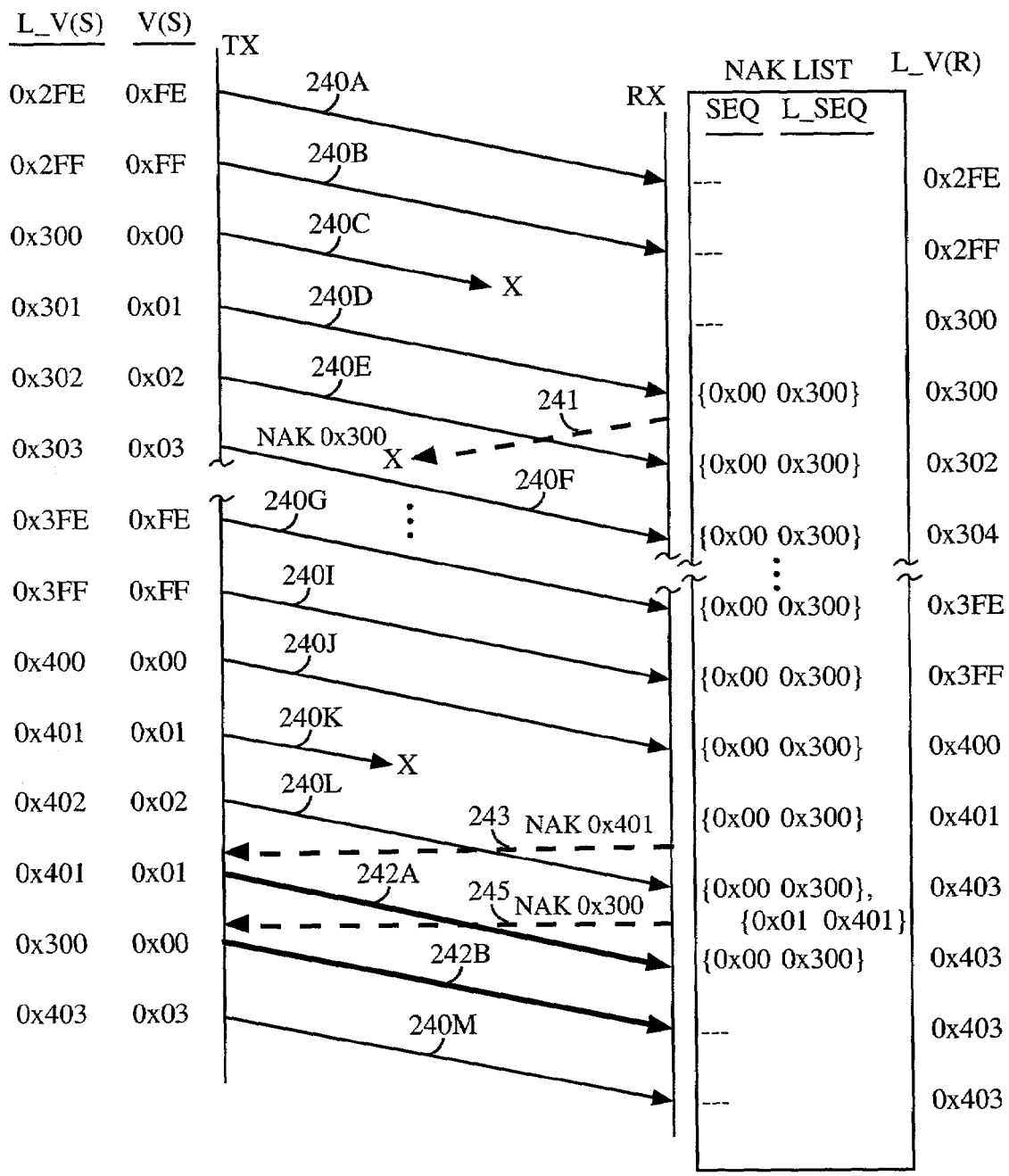
FIG. 8 is a message diagram illustrating the operation of the transmitter and the receiver during an exemplary communication.

In FIG. 8, a message diagram further illustrates the operation of transmitter 50 and receiver 52 during a transmission in which the sequence number "wraps-around," when performed in accordance with one embodiment. Frames 240a and 240b are transmitted with SEQ numbers 0xFE (all numbers are in hexadecimal) and 0xFF, respectively, which correspond to values of 0x2FE and 0x2FF for index L_V(S), and are successfully received by receiver 52, causing L_V(R) to be incremented from 0x2FE to 0x300.

Frame 240c includes SEQ number 0x00 but is not successfully received by receiver 52. Frame 240d includes SEQ number 0x01 and is received properly by receiver 52. Upon receipt of frame 240d, receiver 52 detects that the SEQ number is greater than the eight least significant bits of L_V(R), and therefore that a frame has been received out of order. In response, receiver 52 updates L_V(R) to 0x302, which corresponds to the next expected frame, and places the SEQ number of the unreceived frame into NAK list 94. Additionally, receiver 52 transmits NAK 241 containing the complete L_SEQ number 0x300 of the frame that was not received, and initiates a timer that tracks the amount of time that has expired since the transmission of the NAK 241. As shown in FIG. 8, however, NAK 241 is not received successfully by transmitter 50.

Transmitter 50 continues to transmit frames as shown, including frames 240e–240j, all of which are successfully received by receiver 52. During the transmission of frames 240e–240j, index L_V(S) changes from 0x302 to 0x400, causing a wrap-around in eight least significant bits, and therefore in the SEQ number contained in the frames.

Frame 240k is transmitted with SEQ number 0x01 and is not received successfully by receiver 52. Frame 240I is transmitted with SEQ number 0x02 and is received successfully by receiver 52. Upon receipt of frame 240I, receiver 52 detects an out-of-order transmission, and responds by transmitting NAK 243 containing sequence value 0x401 and by adding sequence number 0x401 to NAK list 94. Additionally, at this time the timer for NAK 241 expires, causing a second NAK 245 containing sequence value 0x300 to be transmitted to transmitter 50. Thus, a second NAK is transmitted for frame 240c. Additionally, receiver 52 sets L_V(R) to the next expected sequence number 0x403. It should be noted that the sequence numbers transmitted in NAKs 243 and 245 could be transmitted in a single NAK message.

Transmitter 50 responds to NAKs 243 and 245 by transmitting retransmitted frame 242a containing the data from frame 240k, and retransmitted frame 242b containing the data from frame 240c. Upon receipt of retransmission frame 242a, receiver 52 identifies the frame as a retransmitted frame based on the status of retransmit flag 74 (see FIG. 2). Once the frame is identified as a retransmitted frame, receiver 52 performs a lookup within NAK list 94, using the SEQ number, and determines which frame has been retransmitted. Retransmitted frame 242a is then placed in the appropriate location within resequencing buffer 92 (see FIG. 2), and the corresponding entry is removed from NAK list 94.

Upon receipt of retransmission frame 242b, receiver 52 also identifies the type of frame and performs a lookup within NAK list 94. When the identity of the frame is determined, it is placed within the resequencing buffer 92 (see FIG. 2), and the corresponding entry is removed from NAK list 94. Transmitter 50 then transmits frame 240m having sequence number 0x03, which is successfully received by receiver 52. At this point, NAK list 94 is empty.

As should be evident from the transmission shown in FIG. 8, marking frames as either "new" or "retransmitted" allows the receiver 52 to properly process both new and retransmitted frames that have the same SEQ numbers even when wrap-around of the sequence number occurs during a retransmission. This is possible because a retransmitted frame with the same SEQ number as a newly transmitted frame can be distinguished by the retransmit flag. Thus, a greater number of frames may be processed using an eight-bit sequence number, which supports significantly higher data rates while maintaining substantial computability with pre-existing standards.

Figure 9:
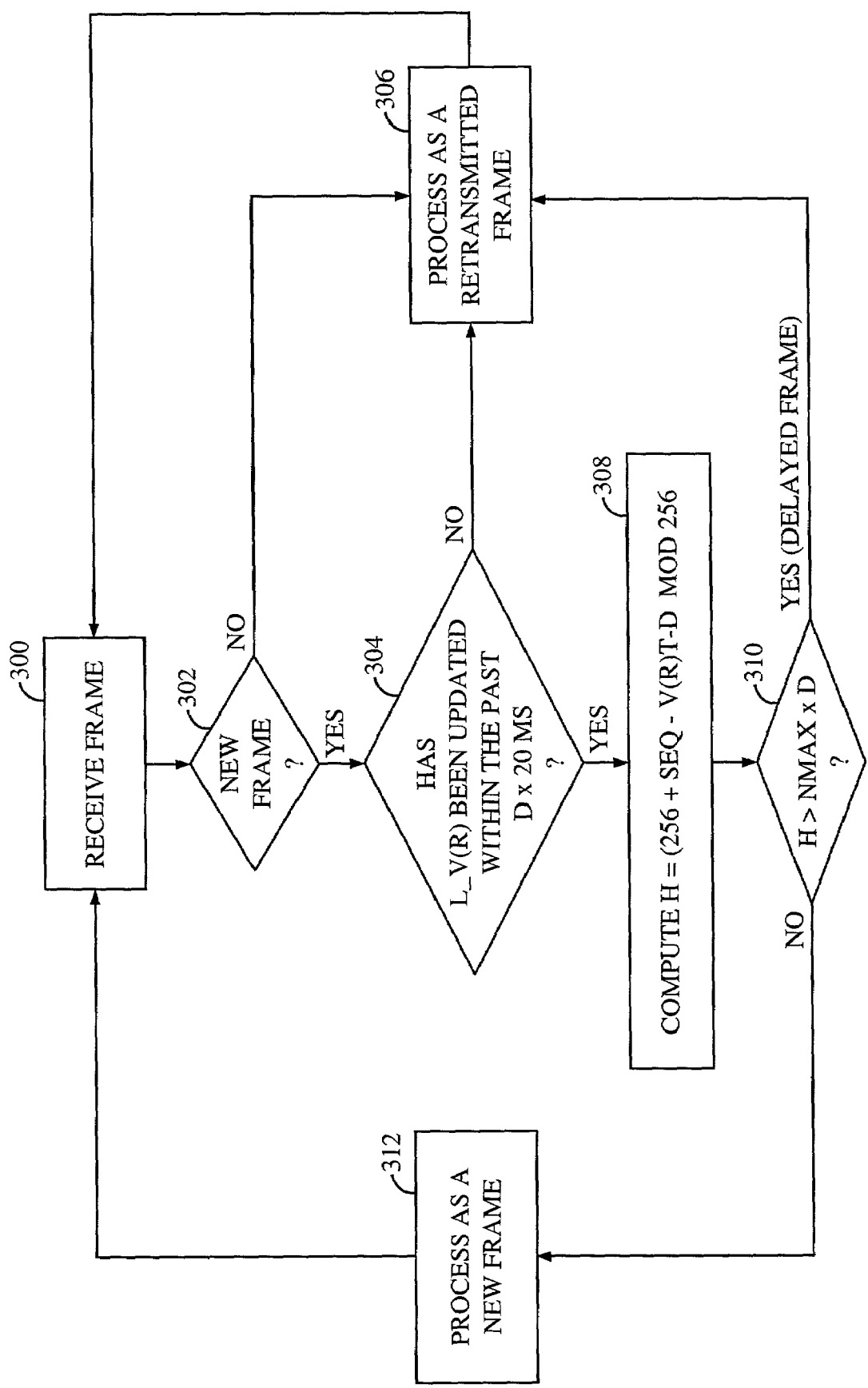
FIG. 9 is a flow chart illustrating the operation of the receiver in recognizing and processing delayed frames.

In FIG. 9, a flow chart illustrates the operation of the receiver 52 in recognizing and processing delayed frames in accordance with one embodiment. A delayed frame may be defined as an RLP frame that is transmitted at the same time on the over-the-air interface with a group, or bundle, of other RLP frames, but has experienced a significantly different delay (e.g., due to a different path length) on its way to the receiver 52. In accordance with the IS-707A standard and RLP, a known protocol for retransmission of data frames, frames are sent over the air in twenty-millisecond (ms) intervals. If the difference in the delay is more than twenty ms, the delayed frame will be received in one of the following twenty-ms processing intervals identified in IS-707A. If not detected as a delayed frame, a delayed RLP frame may cause an RLP reset.

Equation (1), described above in connection with FIGS. 4–6, presents a method for mapping the eight-bit SEQ number (which is transmitted as a frame header over the air) into a twelve-bit L_SEQ number at the receiver 52 to keep track of frame sequence. If, by way of example, frames 1, 2, and 4 of a four-frame bundle are received within the same twenty-ms time interval, but frame 3 is delayed and is received in the following twenty-ms time interval, equation (1) yields the following value for L_SEQ:

$$L\_SEQ = \{L\_V(R) + [256 + SEQ - V(R)]\,MOD\,256\}\,MOD\,4096$$
$$= \{5 + [256 + 3 - 5]\,MOD\,256\}\,MOD\,4096$$
$$= 5 + 254,$$

which indicates that 254 frames are missing. Clearly, this is not the correct interpretation because it is impossible to miss 254 frames within a twenty-ms time interval. In the embodiment depicted in FIG. 9, an RLP algorithm advantageously categorizes such a frame as a delayed frame at the receiver 52.

In the embodiment of FIG. 9, the value D denotes the maximum difference in the arrival time for RLP frames that are transmitted in the same twenty-ms time interval on the over-the-air interface. D is expressed in units of twenty-ms time intervals and is typically zero, one, or two. The number $V(R)_{T-D}$ denotes the value of V(R) at a time of D×20 ms ago. The value $N_{max}$ denotes the maximum number of frames that can be sent in one twenty-ms time interval. $N_{max}$ may be eight in a particular embodiment. In another embodiment, $N_{max}$ may be four.

In step 300, a frame is received at the receiver 52. The algorithm then proceeds to step 302 and determines whether the frame is a new frame. If the frame is a new frame, the algorithm proceeds to step 304. If the frame is not a new frame, the algorithm proceeds to step 306 to process the frame as a retransmitted frame. In step 306, the algorithm processes the frame as a retransmitted frame via a table, as described above. The algorithm then returns to step 300 and receives the next frame.

In step 304, the algorithm determines whether L_V(R) has been updated within the past D×20 ms. LV(R) is the twelve-bit value of V(R), which points to the next frame the RLP algorithm expects to receive in the receive buffer. If L_V(R) has not been updated in the past D×20 ms, equation (1) will not yield an impossibly large number of missing frames, so the algorithm proceeds to step 306, processing the frame as a retransmitted frame. If L_V(R) has been updated within the past D×20 ms, there is a possibility that the new frame is a delayed frame, and the algorithm proceeds to step 308.

In step 308, the algorithm commences new frame processing by computing the value $H=(256+SEQ-V(R)_{T-D})$ MOD 256. The algorithm then proceeds to step 310. In step 310, the algorithm determines whether H is greater than $N_{max} \times D$. If H is greater than $N_{max} \times D$, the algorithm detects the frame as a delayed frame and proceeds to step 306, advantageously processing the detected delayed frame as a retransmitted frame. Those of skill in the art would understand that because L_SEQ equals [L_V(R)+H] MOD 4096 (see equation (1)), checking if H is greater than the threshold value $N_{max} \times D$ (which represents the maximum number of frames that could be missing) simply amounts to comparing L_SEQ with a threshold value. If $L_{13}$SEQ is found to exceed the threshold value, a delayed frame is detected and processed accordingly. Those of skill in the art would likewise appreciate that in an alternate embodiment not employing RLP frames, the delayed frame need not necessarily be processed as a retransmitted frame, but might instead be processed in some other manner. If H is not greater than $N_{max} \times D$, the algorithm proceeds to step 312 and processes the frame as a new frame via equation (1), as described above. The algorithm then returns to step 300 and receives the next frame.

Figure 10:
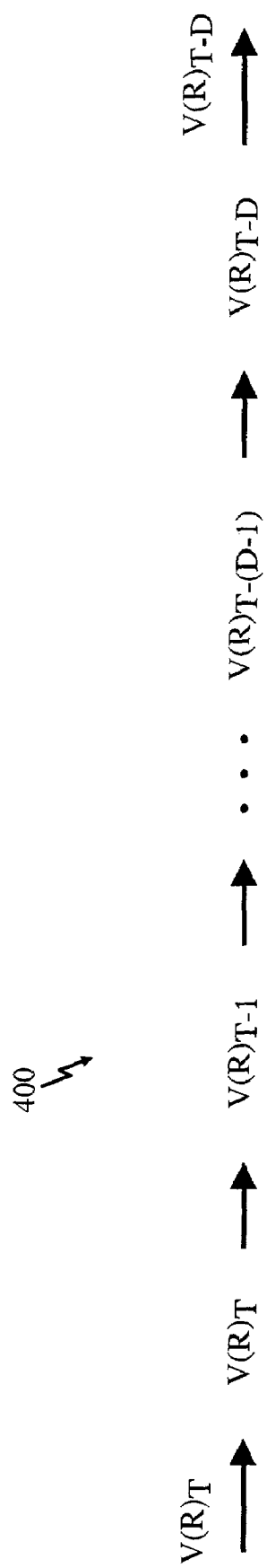
FIG. 10 is a functional diagram of a shift register used in the receiver to update a bit value specifying the next frame to be received.

In one embodiment, illustrated in FIG. 10, a shift register 400 in the receiver 52 (see FIG. 2) may advantageously be used to keep track of the value of $V(R)_{T-D}$. The shift register 400 must have D+1 stages (i.e., the shift register 400 must have a number of bits equal to (D+1) multiplied by the bit length of V(R)). The bit value V(R) is put into the shift register 400 and, as shown, the shift register 400 is shifted every twenty ms to update $V(R)_{T-D}$. If L_V(R) (or, equivalently, V(R)) was not updated within the past twenty-ms time interval, a special value predetermined to denote a "null" symbol is advantageously placed in the shift register 400 to represent that no change took place.

Figure 11:
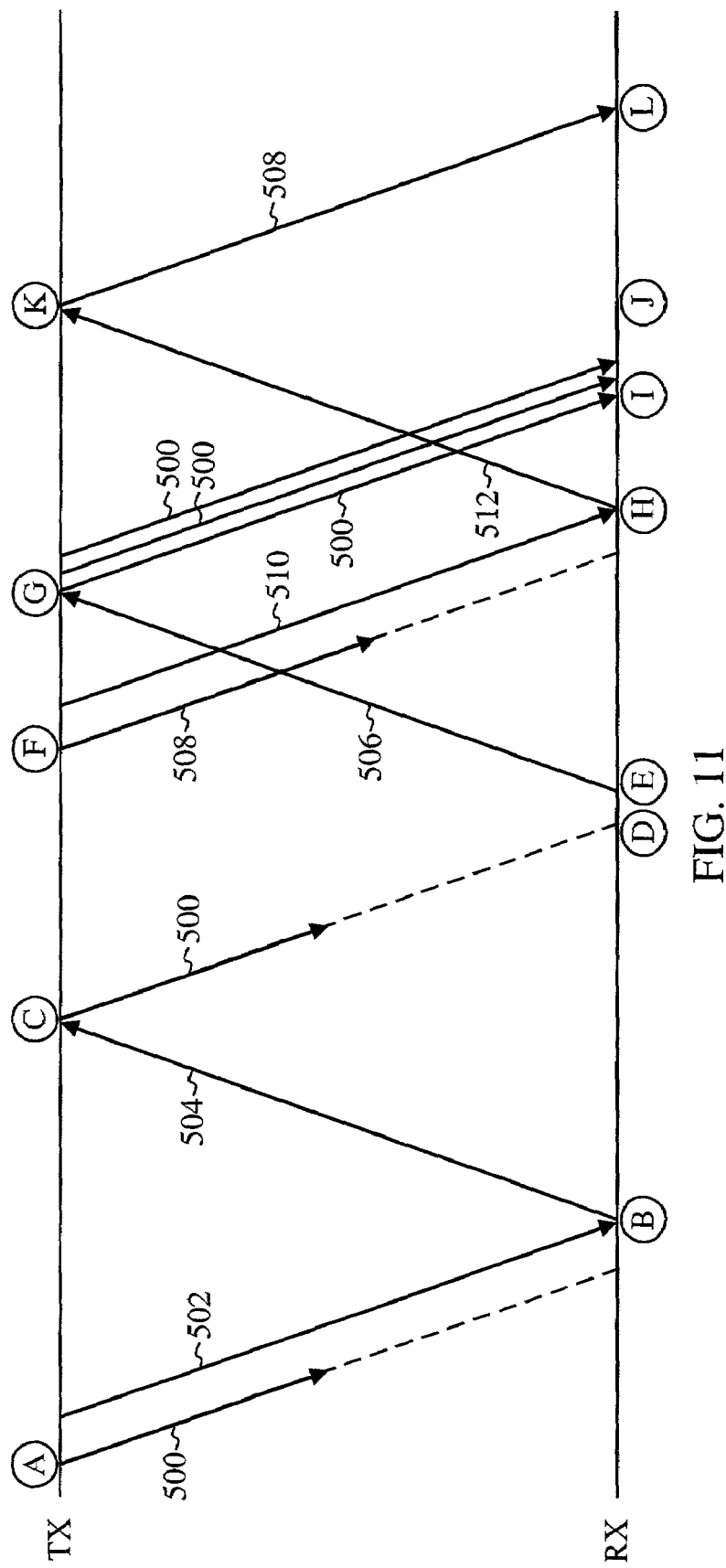
FIG. 11 is a message diagram illustrating the operation of the transmitter and the receiver during an exemplary communication involving multiple retransmitted frames.

In one embodiment, illustrated in FIG. 11, a frame 500 with a SEQ number of 0x02 and an L_V(S) number of 0x302 is sent from the transmitter (depicted functionally at top as a horizontal line) at time a. (Time is understood to increase as the message diagram proceeds from left to right.) As indicated by the dashed line, frame 500 number 0x302 is lost in transmission and fails to arrive at the receiver (depicted functionally at bottom as a horizontal line). Shortly after time a, a second frame 502 having an L_V(S) number of 0x303 is sent from the transmitter. At time b, frame 502 number 0x303 is received at the receiver, a NAK message 504 for frame 500 number 0x302 is generated by the receiver, the number 0x302 is placed in the NAK list, and a retransmit timer is initiated for frame 500 number 0x302. At time c, frame 500 number 0x302 is retransmitted by the transmitter in response to the NAK message 504. As shown by the dashed line, the retransmitted frame 500 number 0x302 is lost in transmission and fails to arrive at the receiver. (Alternatively, the NAK message 504 may have failed to arrive at the transmitter.) At time d, a round-trip time span has elapsed since time b. At time e, after a predefined guard time has elapsed since time d, the retransmit timer for frame 500 number 0x302 expires and an abort timer for frame 500 number 0x302 is initiated. The first round of retransmission (or the first round of NAK) has ended and the second round of retransmission (or the second round of NAK) has begun.

At time e, a second NAK message 506 for frame 500 number 0x302 is sent by the receiver. To increase the probability of reception, multiple copies (not shown) of the NAK message 506 may be sent. At time f, a frame 508 having a SEQ number of 0x02 and an L_V(S) number of 0x402 is sent by the transmitter. As shown by the dashed line, the frame 508 number 0x402 is lost in transmission and fails to arrive at the receiver. Shortly after time f, a second frame 510 having an L_V(S) number of 0x403 is sent by the transmitter. At time g, the first of multiple copies, e.g., three copies, of frame 500 number 0x302 is retransmitted by the transmitter in response to the NAK message 506. The second and third copies of frame 500 number 0x302 are retransmitted shortly thereafter in response to other copies (not shown) of the NAK message 506. At time h, frame 510 number 0x403 is received at the receiver, a NAK message 512 for frame 508 number 0x402 is generated by the receiver, the number 0x402 is placed in the NAK list, and a retransmit timer is initiated for frame 508 number 0x402. As defined in IS-707A, the NAK list is allowed to have only one active entry, which is defined as the oldest entry in the NAK list. Thus, while both the entry for frame 500 number 0x302 and the entry for frame 508 number 0x402 are in the NAK list, the SEQ number 0x02 is mapped only to the active, or oldest, entry, i.e., to the entry for frame 500 number 0x302.

At time i, a round-trip time span has elapsed since time e, and the first copy of the retransmitted frame 500 number 0x302 is received at the receiver. Shortly after time i, the second and third copies of the retransmitted frame 500 number 0x302 are received in succession at the receiver. Conventionally, the entry for frame 500 number 0x302 would be removed from the NAK list at time i because frame 500 number 0x302 is correctly received at time i, with the entry for frame 508 number 0x402 becoming the active, and only, entry in the NAK list. In the embodiment of FIG. 11, the entry for frame 500 number 0x302 is left in the NAK list because frame 500 number 0x302 is in the second round of retransmission (i.e., because the abort timer for frame 500 number 0x302 has been set). At time j, after a predefined guard time has elapsed since time i, the abort timer for frame 500 number 0x302 expires, the entry for frame 500 number 0x302 is deleted from the NAK list (IS-707A specifies that any entry corresponding to a frame whose abort timer has expired is removed from the NAK list), and the entry for frame 508 number 0x402 becomes the active entry in the NAK list. Thus, prior to time j, the SEQ number 0x02 is mapped only to the L_V(S) number 0x302, and after time j, the SEQ number 0x02 is mapped only to the L_V(S) number 0x402. This advantageously resolves the ambiguity that arises in a conventional system in which the second and third copies of the retransmitted frame 500 number 0x302 would be misinterpreted as being frame 508 number 0x402.

At time k, the NAK message 512 for frame 508 number 0x402 arrives at the transmitter. The transmitter consequently retransmits frame 508 number 0x402 at time k. At time l, the retransmitted frame 508 number 0x402 is received at the receiver.

Figure 12:
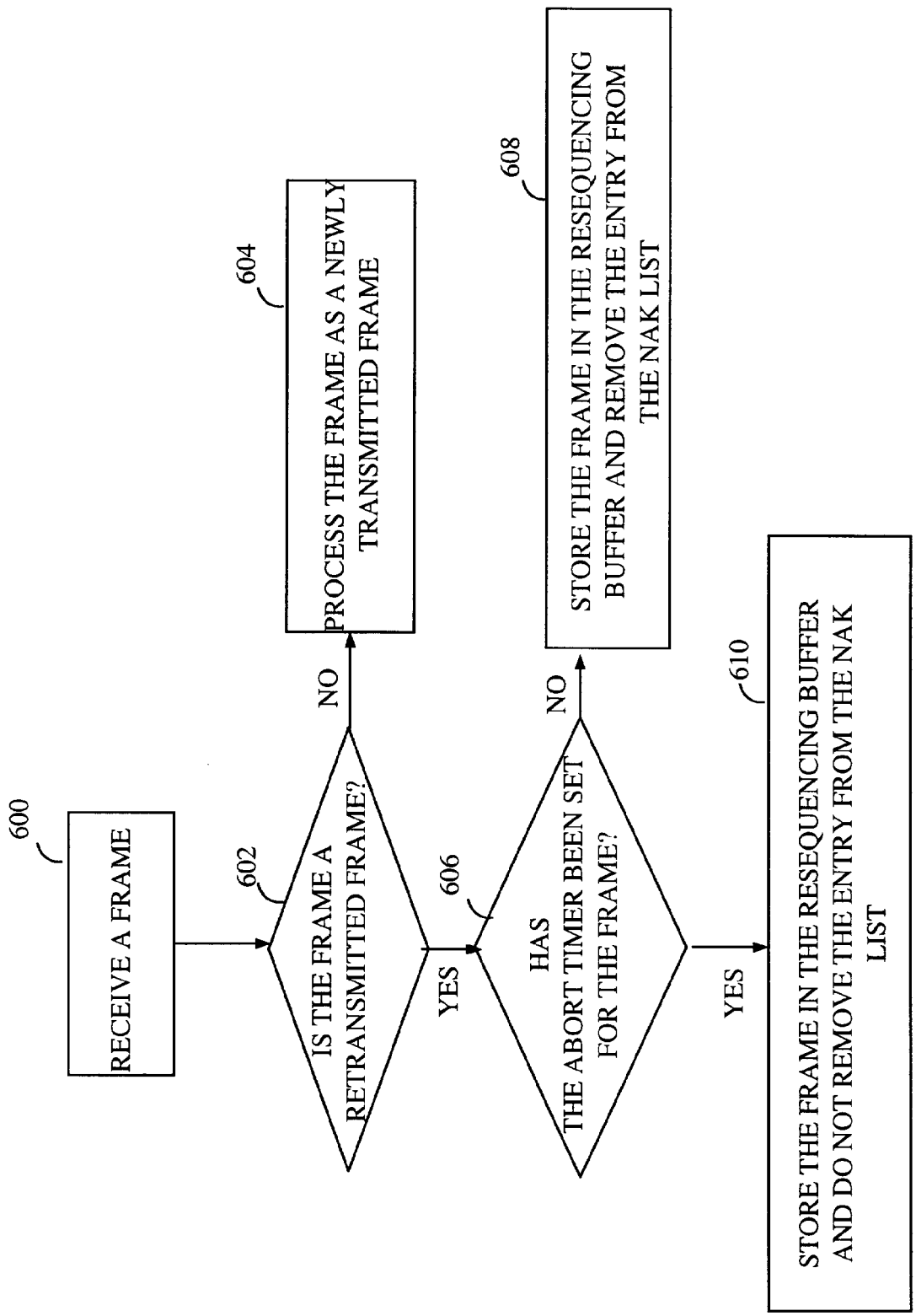
FIG. 12 is a flow chart illustrating the operation of the receiver in recognizing and processing multiple retransmitted frames.

In accordance with one embodiment, a flow chart depicted in FIG. 12 illustrates the steps taken by the receiver in connection with the message diagram of FIG. 11. The steps shown in FIG. 11 are advantageously performed by a microprocessor executing a set of software instructions. Alternatively, the steps may be performed with hardware, firmware, a controller, a state machine, or any equivalent devices known in the art.

In step 600 a frame (not shown), which has been transmitted from the transmitter (also not shown), is received at the receiver (also not shown). In step 602, immediately following, it is ascertained whether the frame is a retransmitted frame. If the frame is not a retransmitted frame, the frame is processed as a newly transmitted frame in accordance with step 604. If, on the other hand, the frame is a retransmitted frame, it is next determined in step 606 whether the abort timer for the frame has been set. If the abort timer for the frame has not been set, the frame is stored in the resequencing buffer (not shown) and the NAK-list entry associated with the frame is removed from the NAK list, in accordance with step 608. If, on the other hand, the abort timer for the frame has been set (which indicates that the frame is in the second round of NAK), the frame is stored in the resequencing buffer and the NAK-list entry associated with the frame is not removed from the NAK list, in accordance with step 610.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of detecting a delayed frame in a transport function wherein a plurality of frames are sent from a transmitter to a receiver, the method comprising the steps of:
    determining a threshold value proportional to a product of a number of frames within a bundle of frames and a maximum delay time in frame-length time increments between frames sent in said bundle of frames;
    comparing, for a received frame, a frame sequencing counter number with said threshold value, the frame sequencing counter number being derived from a header of the received frame; and
    detecting the received frame as a delayed frame if the frame sequencing counter number exceeds said threshold value.

2. The method as recited in claim 1 wherein the plurality of frames is sent in bundles of frames, each bundle including an equal number of frames, the frames within any bundle being sent simultaneously.

3. The method of claim 1, further comprising the step of processing a detected delayed frame as a retransmitted frame.

4. The method of claim 1, wherein the transport function is a Radio Link Protocol interface.

5. An apparatus for detecting a delayed frame in a transport function wherein a plurality of frames are sent from a transmitter to a receiver, the apparatus comprising:
    means for determining a threshold value proportional to a product of a number of frames within a bundle of frames and a maximum delay time in frame-length time increments between frames sent in said bundle of frames;
    means for comparing, for a received frame, a frame sequencing counter number with said threshold value, the frame sequencing counter number being derived from a header of the received frame; and
    means for detecting the received frame as a delayed frame if the frame sequencing counter number exceeds the threshold value.

6. The apparatus as recited in claim 5 wherein the plurality of frames is sent in bundles of frames, each bundle including an equal number of frames, the frames within any bundle being sent simultaneously.

7. The apparatus of claim 5, further comprising means for processing a detected delayed frame as a retransmitted frame.

8. The apparatus of claim 5, wherein the transport function is a Radio Link Protocol interface.

* * * * *